Oct. 1, 1946.　　　F. J. WRIGHT　　　2,408,501
OVERLOAD RELEASE
Filed Aug. 16, 1944　　　2 Sheets-Sheet 1
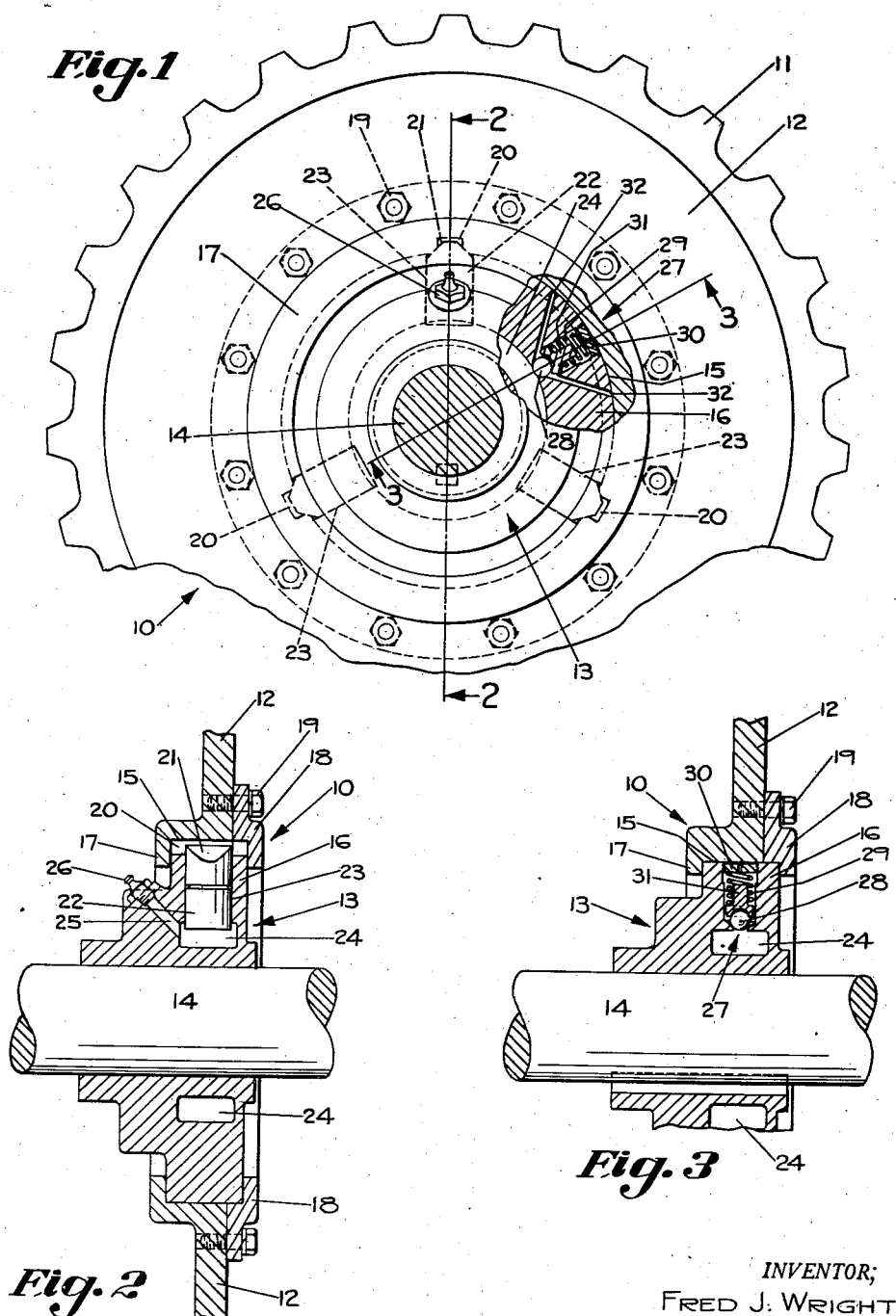
INVENTOR;
FRED J. WRIGHT,
BY
Harker H. Hittson,
ATT'Y.

Oct. 1, 1946.  F. J. WRIGHT  2,408,501
OVERLOAD RELEASE
Filed Aug. 16, 1944  2 Sheets-Sheet 2
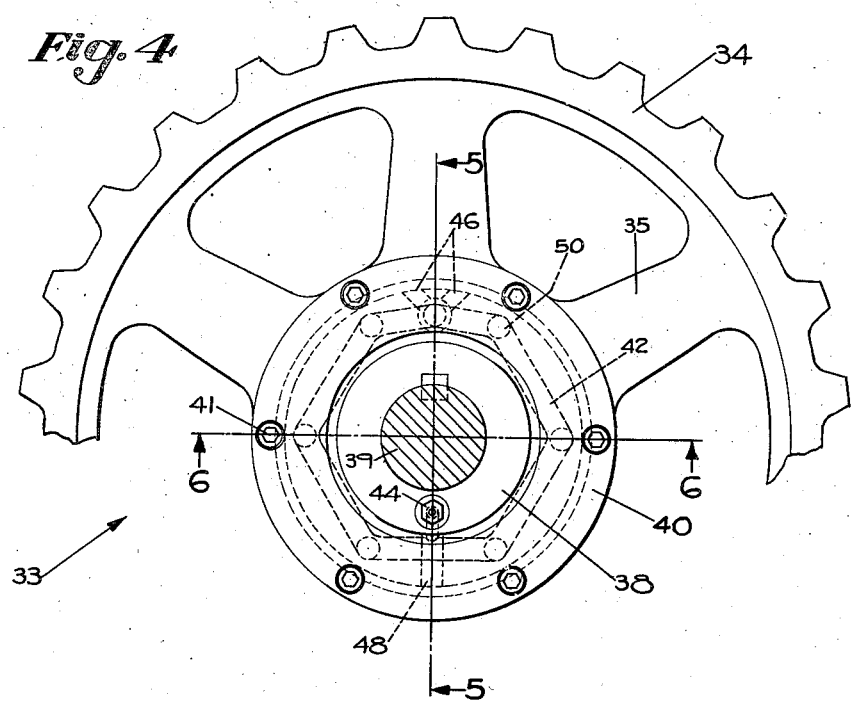
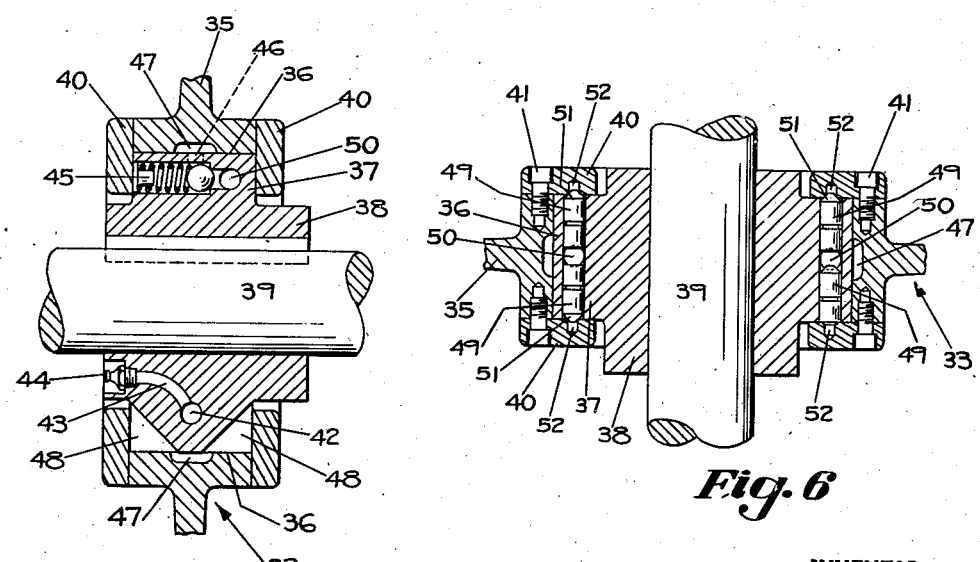
INVENTOR;
FRED J. WRIGHT,
BY
Harker H. Hittson,
ATTY.

Patented Oct. 1, 1946

2,408,501

UNITED STATES PATENT OFFICE 2,408,501

OVERLOAD RELEASE

Fred J. Wright, Upper Arlington, Ohio, assignor, by mesne assignments, to The Jeffrey Manufacturing Company, a corporation of Ohio Application August 16, 1944, Serial No. 549,767

7 Claims. (Cl. 192—56)

This invention relates to an overload release employed between a driving and driven member, and an object thereof is to provide an improved device of this type, which is simple in construction, easily re-set after operating and which does not involve the loss of any metal parts in operation.

A further object of the invention is to provide an overload release employing substantially non-compressible lubricant in the form of grease which can be readily inserted into a chamber by a grease gun and which when operated, preferably ejects the grease to the outside of the overload release mechanism where the grease acts to lubricate bearing surfaces between the driving and driven members.

Another object of the invention is to provide an improved overload release mechanism, employing a substantially non-compressible fluid, in which a plurality of pistons or plungers are actuated when the release is operative.

A further object of the invention is to provide an overload release in which the load at which the release operates, may be readily adjusted.

Other objects of the invention will appear hereinafter, the novel features and combinations being set forth in the appended claims.

In the accompanying drawings,

Fig. 1 is an elevational view with parts in section, showing a sprocket and associated drive shaft incorporating my invention;

Fig. 2 is a sectional view taken on the line 2—2 of Fig. 1, looking in the direction of the arrows;

Fig. 3 is a sectional view taken on the line 3—3 of Fig. 1, looking in the direction of the arrows;

Fig. 4 is a view similar to Fig. 1, of a modified form of overload release;

Fig. 5 is a sectional view taken on the line 5—5 of Fig. 4, looking in the direction of the arrows; and Fig. 6 is a sectional view taken on the line 6—6 of Fig. 4, looking in the direction of the arrows.

Referring first to Figs. 1, 2 and 3 of the drawings, the overload release mechanism is shown as a part of a sprocket which is merely one form in which it may be employed, since obviously it may be used for connecting a wide variety of driving and driven members.

The sprocket 10 includes a rim 11 mounted upon a disc type wheel 12 and preferably formed integral therewith. The wheel or disc 12 is rotatably mounted on a hub 13 which is keyed to a shaft 14. To maintain the wheel 12 of the hub 13, said wheel 12 is provided with a cylindrical bearing surface 15 which rides on a bearing surface provided by the outer peripheral ring portion 16 of the hub 13. That is, the outer peripheral surface of the ring portion 16 has a cylindrical bearing surface which receives the inner cylindrical bearing surface 15 of the wheel 12.

To maintain these surfaces in proper contact, or, in other words, to hold the wheel 12 on the hub 13, the inner peripheral portion of said wheel 12 is provided with an integral cylindrical ring 17 which overlaps one side of the peripheral ring 16. The other side of the peripheral ring 16 is overlapped by a removable ring 18 removably connected to the inner portion of the wheel 12 by machine screws 19. Obviously, the ring 18 permits removal of the wheel 12 from the hub 13 and forms, when assembled, a part of said wheel 12.

The wheel 12 may be considered as a driving member and the hub 13 as a driven member although, obviously, a reverse condition may exist and the overload release mechanism operates substantially the same, regardless of which is the driving and which is the driven member.

Spaced about the circumference of the bearing surface 15 is a plurality of notches 20, there being three such notches illustrated in the drawings, though the number may be increased or decreased, as desired. These notches 20 provide cam surfaces on the interior portion of the wheel 12 into which co-operating cam surfaced heads 21 of pistons 22 extend. As illustrated in the drawings, the pistons 22 extend radially and are spaced equally about the periphery of the hub 13.

Each of the pistons 22 is received in a radial cylinder or cylindrical bore 23 provided in the hub 13, the three cylinders 23 being connected at their bottoms by a circumferential chamber 24 which preferably extends completely around the hub 13.

To maintain each of the pistons 22 in driving relation so that the cam surfaces 21 extend into cooperating cam surfaces of notches 20, the chamber 24 is completely filled with a fluid which is preferably essentially non-compressible. The preferred fluid which I employ is a grease which can be inserted by a grease gun and therefore is very readily available and provides means for easy re-establishment of the driving connection between the driving member and the driven member, following operation in response to an overload.

There are a number of reasons for desiring to use grease, as compared with other non-compressible fluid materials. In the first place, grease and a grease gun are commonly available around practically all machinery. In the second place, grease can be readily inserted into the chamber 24 by simple and generally available mechanism. In the third place, when the overload release operates I prefer, in the complete aspect of my invention, to employ the discharged grease for lubricating the bearing surface 15 and the co-operating bearing surface on the outer periphery of the ring 16.

To provide for filling the chamber 24 with grease, a grease filling passageway 25 extends therefrom to a grease fitting 26 on the outside of the hub 13. The grease fitting 26 is of standard construction and is adapted to receive a grease gun and has a check valve built therein in accordance with standard practice, so that when the pistons 22 are in their driving positions, as illustrated in Figs. 1 and 2 of the drawings, the chamber 24 and passageway 25 may be completely filled with grease and thus lock said pistons 22 in place under a pressure relief valve now to be described.

To provide the overload release, there is in communication with the chamber 24 an adjustable high pressure relief valve 27 which includes a ball check 28 adapted to be pressed against a seat in a port communicating with the passageway 24.

Pressure is applied to the ball 28 by a spring 29 which at its outer end bears against a screw-threaded head 30 and at its inner end bears against a shoulder of a spring guide 31. When the ball 28 is lifted in response to a predetermined pressure in the chamber 24 communicated thereto in response to an overload by the fluid grease, the grease can flow through a pair of bores or passageways 32 which extend to the outer peripheral surface of the peripheral ring 16. Thus, the grease which is forced out from the passageway 24 in response to an overload is ejected to the outside of the overload release mechanism and will lubricate the bearing surfaces provided between the wheel 12 and the hub 13.

In Figs. 4, 5 and 6 of the drawings I have illustrated another form of overload release between a driving member and a driven member. In this construction, the driving member is in the form of a sprocket 33 having a rim 34 and a wheel 35, the inner peripheral portion of which is provided with a cylindrical bearing surface 36 which rides on an outer peripheral ring 37 of a hub 38 keyed to a shaft 39. The wheel 35 is held on the hub 38 by a pair of spaced rings 40 which are removably attached to the wheel 35 by spaced machine screws 41.

In this construction there is a grease chamber 42 which extends entirely around the hub 37 and is located at the approximate center thereof, for a purpose hereinafter pointed out. A grease filling passageway 43 extends from a grease fitting 44 to the chamber 42, the grease fitting 44 being of the same construction as the grease fitting 26.

Co-operating with the passageway 42 is a pressure relief valve 45 which is generally similar in structure and function to the relief valve 27. It provides for a release of the grease from the chamber 42 to a pair of passageways 46 (see Fig. 4) which lead to the outside of the overload mechanism and to the outer peripheral surface of the peripheral ring 37 and to the bearing surface 36. The bearing surface 36 is really two axially spaced surfaces separated by a peripheral groove 47 which provides for free passage of the discharged grease around the entire periphery of the spaced surfaces 36. Any excess grease may be discharged axially to opposite sides of the hub 38 by relief passageways 48 (see Fig. 5) formed on opposite sides of the hub 38. It is evident by reference to Fig. 5 of the drawings that the chamber 42 is offset slightly from its central position adjacent the relief valve 45.

In the form of the release mechanism illustrated in Figs. 4, 5 and 6 of the drawings, I employ a plurality of pistons 49 which are contained in opposite sides of axial cylinders or bores 50 which extend completely through the peripheral ring 37 of the hub 38. These cylinders or bores 50 extend parallel with the axis of the shaft 39 or, in other words, with the axis of rotation of the wheel 35 and hub 38. It is to be noted that each intersects or communicates with the chamber 42 substantially at its center. Furthermore, each bore 50 contains a pair of pistons 49, the bases of which normally face each other and each is exposed directly to the grease sealed within the chamber 42.

Each of the pistons 49 is provided with a cam surfaced head 51 which extends into a co-operating cam or notch 52, there being a plurality of said cams or notches 52 formed on each of the rings 40. Obviously, the driving connection provided between the cam surfaces 51 and 52 provides a driving relation between the driving and driven members 35 and 38.

As illustrated in connection with the lower right-hand piston 49 in Fig. 6 of the drawings, the load under which the release mechanism operates may be adjusted over a wide range by the simple expedient of reversing the position of a piston 49 in the cylinder or bore 50. For example, said lower right-hand piston 49 of Fig. 6, has its cam surfaced head 51 extending inwardly rather than extending outwardly and as a consequence it provides no driving connection between the wheel 35 and the hub 38 but it does perform the function of filling the lower portion of the right-hand cylinder 50, as viewed in Fig. 6 of the drawings.

Obviously, by reversing different numbers of pistons 49 the load under which the release mechanism operates may be variably adjusted and this is particularly true where there are a number of pistons 49 employed. In the illustration of the device in Fig. 4 it is evident that there are two pistons 49 to each cylinder or bore 50 and there are six bores, thus providing for twelve such pistons, any number between 1 and 12 of which may provide the driving relation between the wheel 35 and hub 38.

The action of the devices of both modifications is essentially the same except in that of Figs. 1, 2 and 3 the pistons move radially inwardly in response to an overload, and in that of Figs. 4, 5 and 6 the pistons move axially in response to an overload. In each case, under normal conditions, the pistons are in their outermost positions and the chambers 24 and 42 are filled with grease. When an overload is encountered, the driving member which, for illustrative purposes, is considered as the wheel 12 or 35, rotates with respect to the hub 13 or 38. The camming action between the surfaces 20 and 21 in the one instance and 51 and 52 in the other instance, causes inward movement of the pistons 22 and 49, respectively, forcing the substantially non-compressible grease out against the action of the relief valves 27 and 45, respectively, the grease flowing to the bearing surfaces between the rings and hubs to grease or lubricate them.

After the overload condition has been corrected, the notches 20 and 51 are aligned with the pistons 22 and 49 and a grease gun applied to the fitting 26 or 44, and the chamber 24 or 42 and all communicating passageways are again filled with grease, forcing the pistons 22 or 49 into their driving positions, as illustrated in the various figures of the drawings.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. An overload release mechanism including a driving member and a driven member mounted one on the other for relative rotation, overload release mechanism connecting said members, said mechanism including a plunger and a co-operating recess, said plunger working into a chamber filled with grease, a passageway leading from said chamber to contacting surfaces between said driving and driven members, and a relief valve operable under predetermined pressure to provide for flow of grease from said chamber and through said passageway.

2. An overload release mechanism including a driving member and a driven member mounted for relative rotation on a common axis, overload release mechanism connecting said members, said mechanism including a pair of aligned plungers positioned to one side of said axis and co-operating recesses, said plungers working into a chamber filled with grease, and a relief valve operable under predetermined pressure within said chamber to provide for flow of grease from said chamber to contacting bearing surfaces between said driving members.

3. An overload release mechanism including a driving member and a driven member mounted for relative rotation, overload release mechanism connecting said members, said mechanism including a plunger and a co-operating recess, said plunger working into a chamber filled with grease, a pressure responsive relief valve operable under predetermined pressure within said chamber to provide for flow of grease from said chamber to the outside of said overload release mechanism, and means providing for recharging said chamber with grease after said overload release mechanism has operated including a valve positioned externally of said overload release mechanism.

4. A sprocket including a hub, a wheel mounted thereon for relative rotation therewith, means providing a releasable driving connection between said hub and wheel, said means including a chamber in said hub, a plurality of pistons extending radially from said hub and having cam surfaces co-operating with cam surfaces on said wheel, said pistons being spaced radially about said hub and each extending into said chamber, a pressure responsive relief valve communicating with said chamber and leading to a passageway extending to common bearing surfaces between said hub and wheel, and lubricating material filling said chamber and releasably holding said pistons to provide a driving connection between said hub and wheel.

5. A sprocket including a hub, a wheel mounted thereon for relative rotation therewith, means providing a releasable driving connection between said hub and wheel, said means including a chamber in said hub, a plurality of pistons extending axially from said hub and having cam surfaces co-operating with cam surfaces on said wheel, said pistons being spaced radially about said hub and each extending into said chamber, a pressure responsive relief valve communicating with said chamber, and a substantially non-compressible fluid filling said chamber and releasably holding said pistons to provide a driving connection between said hub and wheel.

6. Overload release mechanism including a hub, a wheel mounted for rotation on said hub, an axial bore in said hub, a chamber communicating with said bore, substantially non-compressible fluid material in said chamber, pistons in said bore having outer cam heads extending axially from opposite sides of said bore, cams on said wheel co-operating with said cam heads to provide a releasable driving connection between said wheel and hub, and means for releasing said fluid to flow from said chamber in response to a predetermined load on said wheel.

7. An overload release mechanism including a driving member and a driven member mounted one on the other for relative rotation, overload release mechanism connecting said members, said mechanism including a plunger and a co-operating recess, said plunger working into a chamber filled with lubricant, a passageway leading from said chamber to contacting surfaces between said driving and driven members, and a relief valve operable under predetermined pressure to provide for flow of lubricant from said chamber and through said passageway.

FRED J. WRIGHT.